(12) United States Patent
Sonnenberg

(10) Patent No.: US 10,474,942 B2
(45) Date of Patent: Nov. 12, 2019

(54) MINIATURIZED RADIO FREQUENCY IDENTIFICATION TAG

(71) Applicant: ONCHIP, LTD., Zhubei (TW)

(72) Inventor: John Sonnenberg, Zhubei (TW)

(73) Assignee: Onchip, Ltd., Hsinchu County (TW)

( * ) Notice: Subject to any disclaimer, the term of this patent is extended or adjusted under 35 U.S.C. 154(b) by 0 days.

(21) Appl. No.: 16/015,456

(22) Filed: Jun. 22, 2018

(65) Prior Publication Data
US 2018/0373973 A1 Dec. 27, 2018

(30) Foreign Application Priority Data
Jun. 22, 2017 (TW) .............................. 106120912 A

(51) Int. Cl.
*G06K 19/06* (2006.01)
*G06K 19/077* (2006.01)

(52) U.S. Cl.
CPC . *G06K 19/07722* (2013.01); *G06K 19/07773* (2013.01); *G06K 19/07784* (2013.01)

(58) Field of Classification Search
CPC ....... G06K 19/07722; G06K 19/07773; G06K 19/07784

USPC .................................................. 235/492, 487
See application file for complete search history.

(56) References Cited

U.S. PATENT DOCUMENTS

2013/0082882 A1* 4/2013 Higashiyama ... G06K 19/07718
343/700 MS

FOREIGN PATENT DOCUMENTS

| CN | 202395152 U | 8/2012 |
|---|---|---|
| TW | I480805 | 4/2015 |
| TW | M505711 | 7/2015 |

* cited by examiner

*Primary Examiner* — Karl D Frech
(74) *Attorney, Agent, or Firm* — Rosenberg, Klein & Lee

(57) ABSTRACT

The invention provides a miniaturized radio frequency identification tag, which comprises a radio frequency identification chip and an antenna. The antenna comprises a plurality of loop antenna line segments. Each of loop antenna line segments is disposed on a corresponding insulating layer, and electrically connected to the radio frequency identification chip or the other loop antenna line segment via a corresponding conductive through hole. Accordingly, the structure of the antenna is fabricated by multi-layer loop antenna line segments so as to reduce the size of the radio frequency identification tag, effectively.

16 Claims, 19 Drawing Sheets

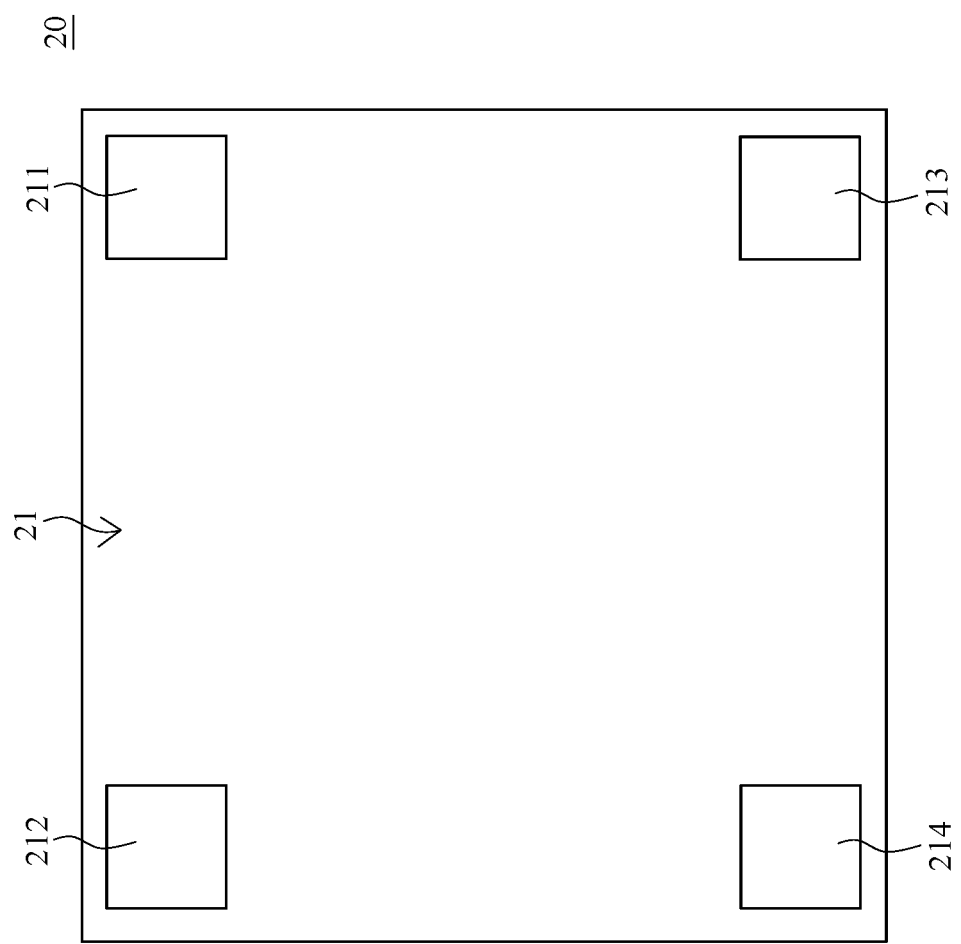

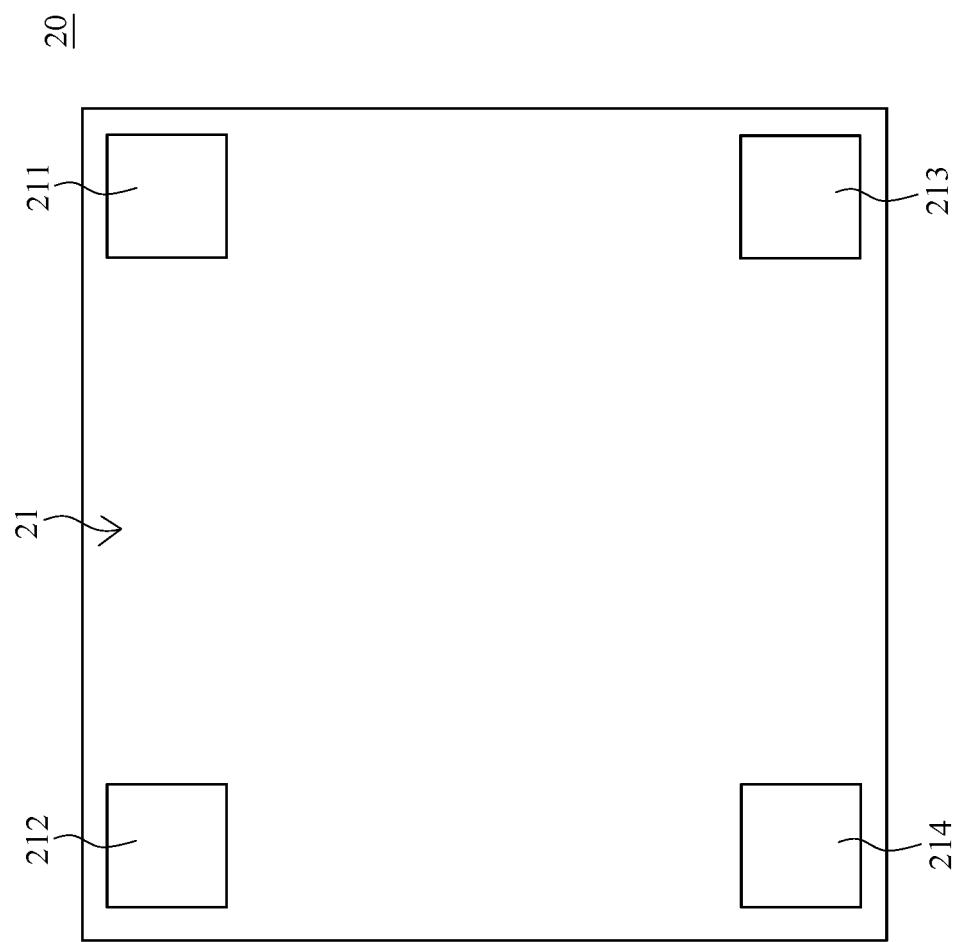

MINIATURIZED RADIO FREQUENCY IDENTIFICATION TAG

This non-provisional application claims priority claim under 35 U.S.C. § 119 (a) on Taiwan Patent Application No. 106120912 filed Jun. 22, 2017, the entire contents of which are incorporated herein by reference.

FIELD OF THE INVENTION

The present invention relates to a radio frequency identification tag, particularly to a miniaturized radio frequency identification tag.

BACKGROUND

With the advancement of science and technology, RFID (radio frequency identification) technology has been widely used in logistics management, mobile payment or access management. In the RFID technology, RFID tag is usually disposed on an object. People can use an RFID reader to read a data stored in the RFID tag in a non-contact. Afterwards, the data read from the RFID tag can be used for identifying the RFID tag or obtaining the related information of the object.

Referring to FIGS. 1A and 1B, there are shown a structural top view and a structural side view of an RFID tag in prior art. As shown in FIG. 1A and 1B, RFID tag 100 comprises a PCB (printed circuit board) 11, at least one antenna 12, and an RFID chip 13. The antenna 12 and the RFID chip 13 are provided on the PCB 11. The PCB 11 is provided with a plurality of circuit lines 111 thereon. The RFID chip 13 is connected to the circuit lines by a plurality of electrically terminals 131, and further electrically connected to the antenna 12 by the circuit lines 111.

In the past, the RFID tag 100 is produced by a way of the PCB fabrication, the size of which is often large because of the inherent limitation of process of PCB fabrication, so that the application field of the RDIF tag 100 will be limited. For example, the RDIF tag 100 having the larger size is unable to be disposed on a smaller size of object, for example, electronic component, jewelry, etc., Furthermore, the larger size of RDIF tag 100 is also more susceptible to be collided by external forces, such that it is easy to damage.

For the reason, the present invention provides a novel RFID tag, in which the RFID tag is produced by a way of wafer fabrication, and the antenna structure of the RFID tag may be formed by multi-layers of loop segments so as to obtain a miniaturized RFID tag, it is to be achieved the object of the present invention.

SUMMARY

It is one object of the present invention to provide a miniaturized radio frequency identification tag, which comprises an RFID chip and an antenna. The structure of the antenna can be formed by multi-layer loop antenna line segments so as to reduce the size of the RFID tag, effectively.

It is another object of the present invention to provide a miniaturized radio frequency identification tag, in which the loop antenna line segments of the antenna are designed as a spiral line segment having more bending, respectively, so that the length of the line segment of the antenna can be increased to expand a communication distance of the radio frequency identification tag.

It is another object of the present invention to provide a miniaturized radio frequency identification tag, in which the loop antenna line segments of the antenna are produced in a way of wafer fabrication, and sequentially stacked on the RFID chip so that the size of the RFID tag is able to be miniaturized, effectively.

To achieve the above object, the present invention provides a miniaturized radio frequency identification tag, comprising: a radio frequency identification chip comprising an active surface, the active surface comprising a first antenna bonding pad and a second antenna bonding pad; a first insulation layer, configured on the radio frequency identification chip, used for covering the radio frequency identification chip, and comprising a first conductive through hole and a second conductive through hole, wherein the first conductive through hole is configured on the first antenna bonding pad of the radio frequency identification chip, and the second conductive through hole is configured on the second antenna bonding pad of the radio frequency identification chip; a first loop antenna line segment configured on the first insulation layer, wherein the first loop antenna line segment is provided at one end thereof with a first connection pad, and provided at other thereof with a second connection pad, the first connection pad of the first loop antenna line segment is electrically connected to the first antenna bonding pad of the radio frequency identification chip via the first conductive through hole; a first connection line segment configured on the first insulation layer, wherein the first connection line segment is electrically connected to the second antenna bonding pad of the radio frequency identification chip via the second conductive through hole; a second insulation layer, configured on the first insulation layer, used for covering the first loop antenna line segment and the first connection line segment, and comprising a third conductive through hole and a fourth conductive through hole; a second loop antenna line segment configured on the second insulation layer, wherein the second loop antenna line segment is provided at one end thereof with a third connection pad, and provided at other thereof with a fourth connection pad, the third connection pad of the second loop antenna line segment is electrically connected to the second connection pad of the first loop antenna line segment via the third conductive through hole, the fourth connection pad of the second loop antenna line segment is electrically connected to the first connection line segment via the fourth conductive through hole; and a third insulation layer, configured on the second insulation layer, and used for covering the second loop antenna line segment.

In one embodiment of the present invention, wherein the first insulation layer, the first loop antenna line segment, the first connection line segment, the second insulation layer, the second loop antenna line segment, and the third insulation layer are produced in a way of wafer fabrication, and sequentially stacked on the radio frequency identification chip.

In one embodiment of the present invention, wherein the first loop antenna line segment and the second loop antenna line segment are a spiral line segment having more bending, respectively.

In one embodiment of the present invention, wherein the ratio of the line width to the line space of the first loop antenna line segment is 1:1, and the ratio of the line width to the line space of the second loop antenna line segment is 1:1.

In one embodiment of the present invention, wherein the line width/the line space of the first loop antenna line segment is 15 μm/15 μm, the line width/the line space of the second loop antenna line segment is 15 μm/15 μm.

In one embodiment of the present invention, wherein the miniaturized radio frequency identification tag further comprises: at least one additional insulation layer is configured between the first insulation layer and the second insulation layer, and comprises a first additional conductive through hole and a second additional conductive through hole; at least one additional loop antenna line segment is configured between the additional insulation layer and the second insulation layer, and provided at one end thereof with a first additional connection pad, and provided at other end thereof with a second additional connection pad, wherein the first additional connection pad of the additional loop antenna line segment is electrically connected to the second connection pad of the first loop antenna line segment via the first additional conductive through hole, and the second additional connection pad of the additional loop antenna line segment is electrically connected to the third connection pad of the second loop antenna line segment via the third conductive through hole; and at least one additional connection line segment is configured between the additional insulation layer and the second insulation layer, wherein the additional connection line segment is connected at one end thereof to the first connection line segment via the second additional conductive through hole, and connected at other end thereof to the fourth connection pad of the second loop antenna line segment via the fourth conductive through hole.

In one embodiment of the present invention, wherein the first insulation layer, the first loop antenna line segment, the first connection line segment, the additional insulation layer, the additional loop antenna line segment, the additional connection line segment, the second insulation layer, the second loop antenna line segment, and the third insulation layer are produced in a way of wafer fabrication, and sequentially stacked on the radio frequency identification chip.

In one embodiment of the present invention, wherein the additional loop antenna line segment is a spiral line segment having more bending.

In one embodiment of the present invention, wherein the ratio of the line width to the line space of the additional loop antenna line segment is 1:1.

In one embodiment of the present invention, wherein the line width/the line space of the additional loop antenna line segment is 15 μm/15 μm.

In one embodiment of the present invention, wherein the first insulation layer, the additional insulation layer, and the second insulation layer are synthetic insulation layers produced by polybenzoxazole.

In one embodiment of the present invention, wherein the miniaturized radio frequency identification tag is fabricated by a means of bumpless procedure.

In one embodiment of the present invention, wherein the miniaturized radio frequency identification tag is a passive radio frequency identification tag.

BRIEF DESCRIPTION OF THE DRAWINGS

FIG. 3A is a structural top view of a radio frequency identification chip of the present invention.

FIG. 5A is a structural top view of a radio frequency identification chip of the present invention.

DETAILED DESCRIPTION OF THE PREFERRED EMBODIMENTS

Figure 1A:
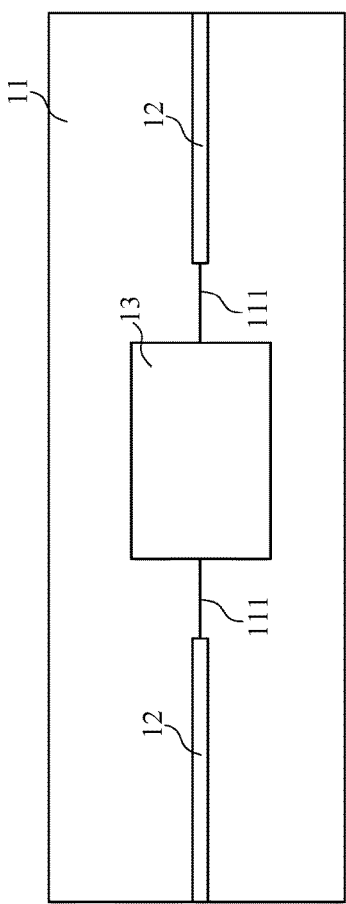
FIG. 1A is a structural top view of an RFID tag in prior art.
Figure 1B:
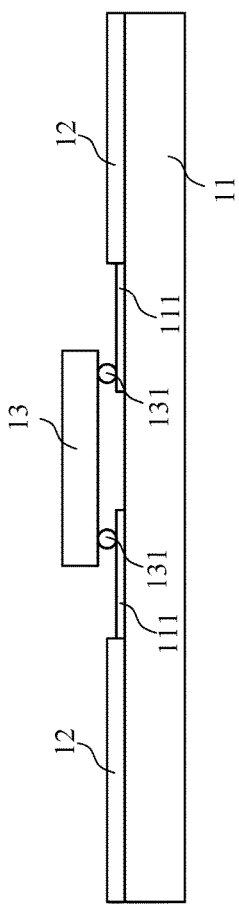
FIG. 1B is a structural side view of the RFID tag in prior art.
Figure 2:
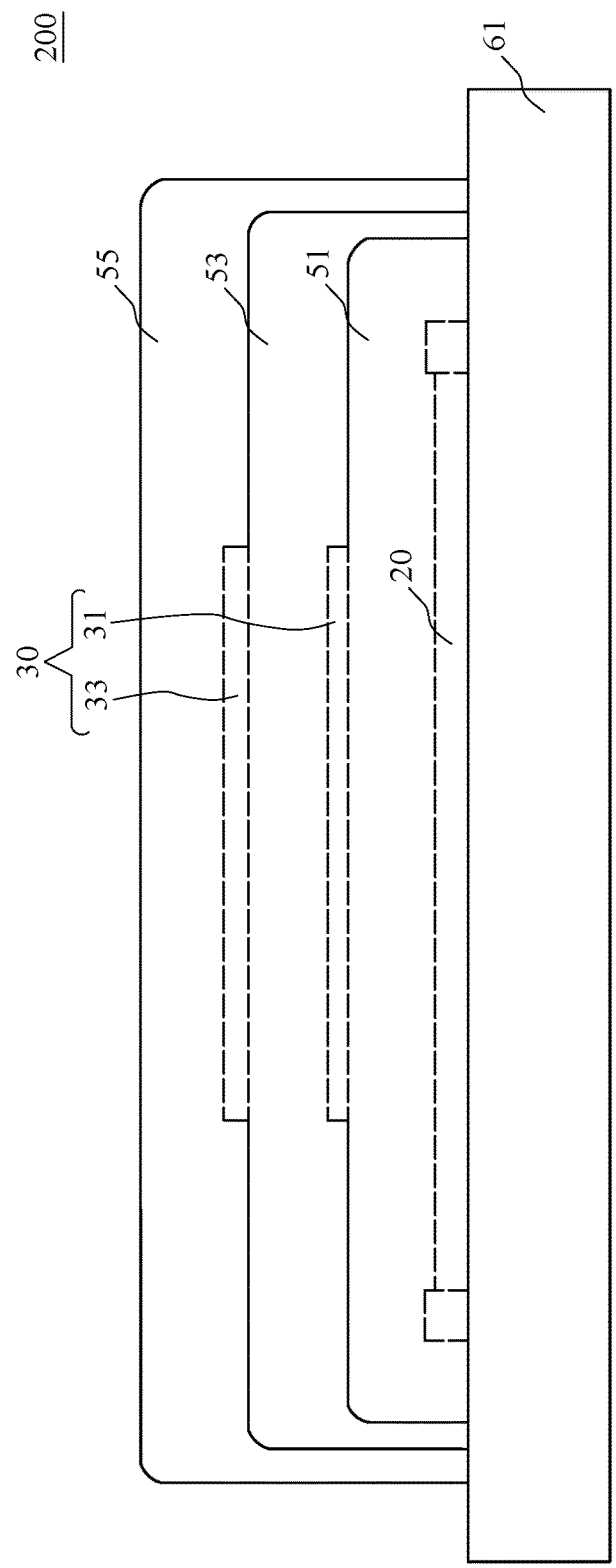
FIG. 2 is a structural perspective side view of a radio frequency identification tag according to one embodiment of the present invention.

Referring to FIG. 2, there is shown a structural perspective side view of a radio frequency identification tag according to one embodiment of the present invention, as well as referring to FIGS. 3A to 3E, there are shown a structural top view of each layer of the radio frequency identification tag according to one embodiment of the present invention, respectively. As shown in FIG. 2, the radio frequency identification (RFID) tag 200 of the present invention is a passive and ultra high frequency (UHF) RFID tag, and is with a small on-chip antenna (OCA). The RFID tag 200 comprises an RFID chip 20 and an antenna 30. In one embodiment of the present invention, the antenna 30 is consisted of redistribution layers (RDL's), which are metal layers on the RFID chip 20 that makes the I/O pads of the RFID chip 20 available in other locations. The antenna 30 comprises a first loop antenna line segment 31 and a second loop antenna line segment 33. The first loop antenna line segment 31 and the second loop antenna line segment 33 comprise the RDL layer's.

The RFID tag 200 of the present invention is produced in a way of wafer fabrication. As shown in FIGS. 2 and FIG. 3A, firstly, the RFID chip 20 comprises an active surface 21.

The active surface 21 comprises a plurality of bonding pads 211, 212, 213, and 214. In the present embodiment, the bonding pad 211 is a first antenna bonding pad, and the bonding pad 212 is a second antenna bonding pad.

Figure 3B:
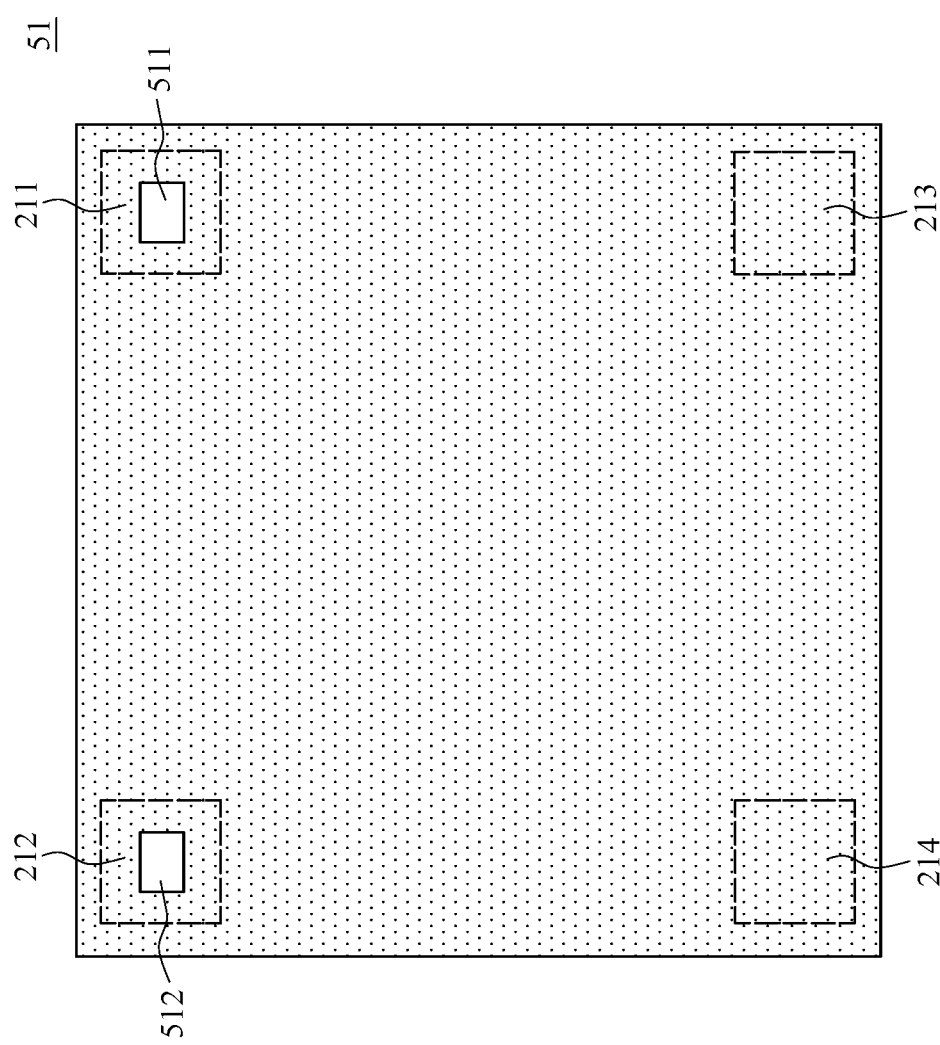
FIG. 3B is a structural top view of a first insulation layer of the present invention.

As shown in FIG. 2 and FIG. 3B, a first insulation layer 51 is configured on the RFID chip 20 and used for covering the RFID chip 20. The first insulation layer 51 comprises a first conductive through hole 511 and a second conductive through hole 512. The first conductive through hole 511 is through the first insulation layer 51 to configure on the first antenna bonding pad 211, and the second conductive through hole 512 is through the first insulation layer 51 to configure on the second antenna bonding pad 212.

Figure 3C:
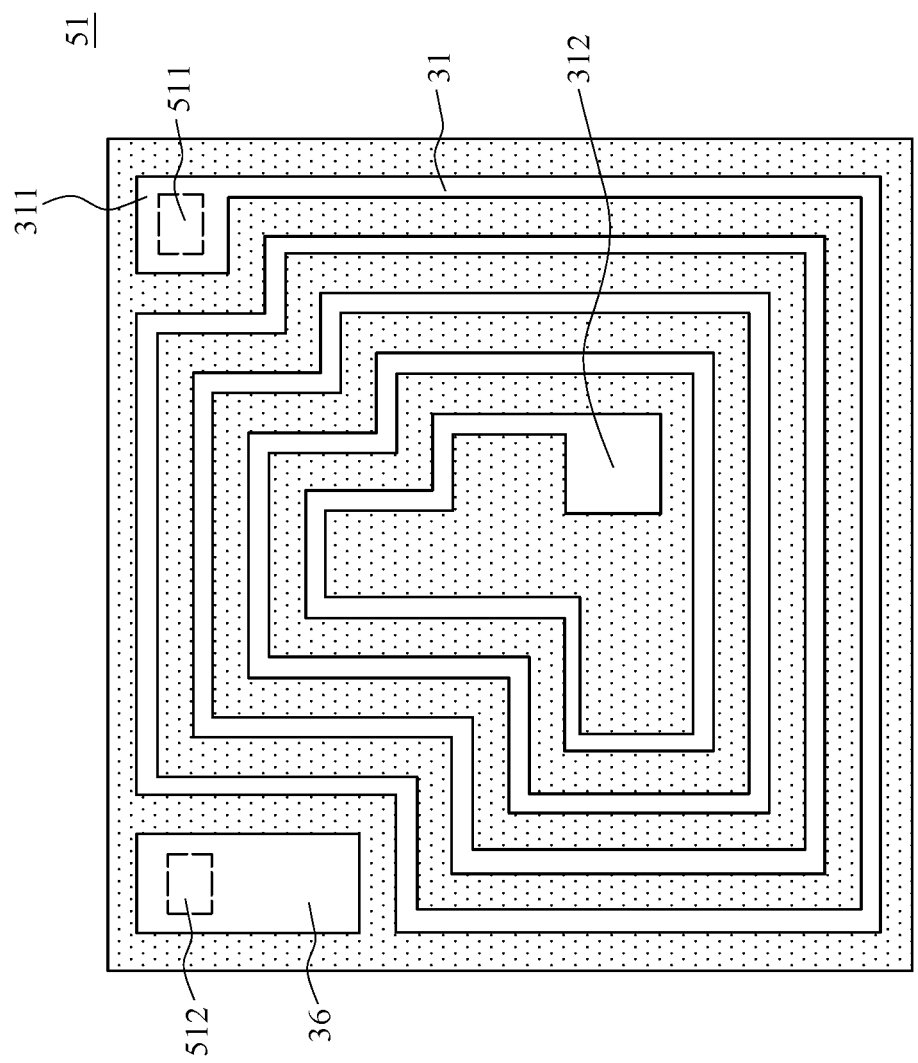
FIG. 3C is a structural top view of the first insulation layer provided with a first loop antenna segment and a first connection line segment of the present invention.

As shown in FIG. 2, FIG. 3B, and FIG. 3C, the first loop antenna line segment 31 is configured on the first insulation layer 51. The first loop antenna line segment 31 is provided at one end thereof with a first connection pad 311, and provided at other thereof with a second connection pad 312. The first connection pad 311 of the first loop antenna line segment 31 is electrically connected to the first antenna bonding pad 211 of the RFID chip 20 via the first conductive through hole 511. Besides, the first insulation layer 51 is further provided with a first connection line segment 36 thereon. The first connection line segment 36 is electrically connected to the second antenna bonding pad 212 of the RFID chip 20 via the second conductive through hole 512.

Figure 3D:
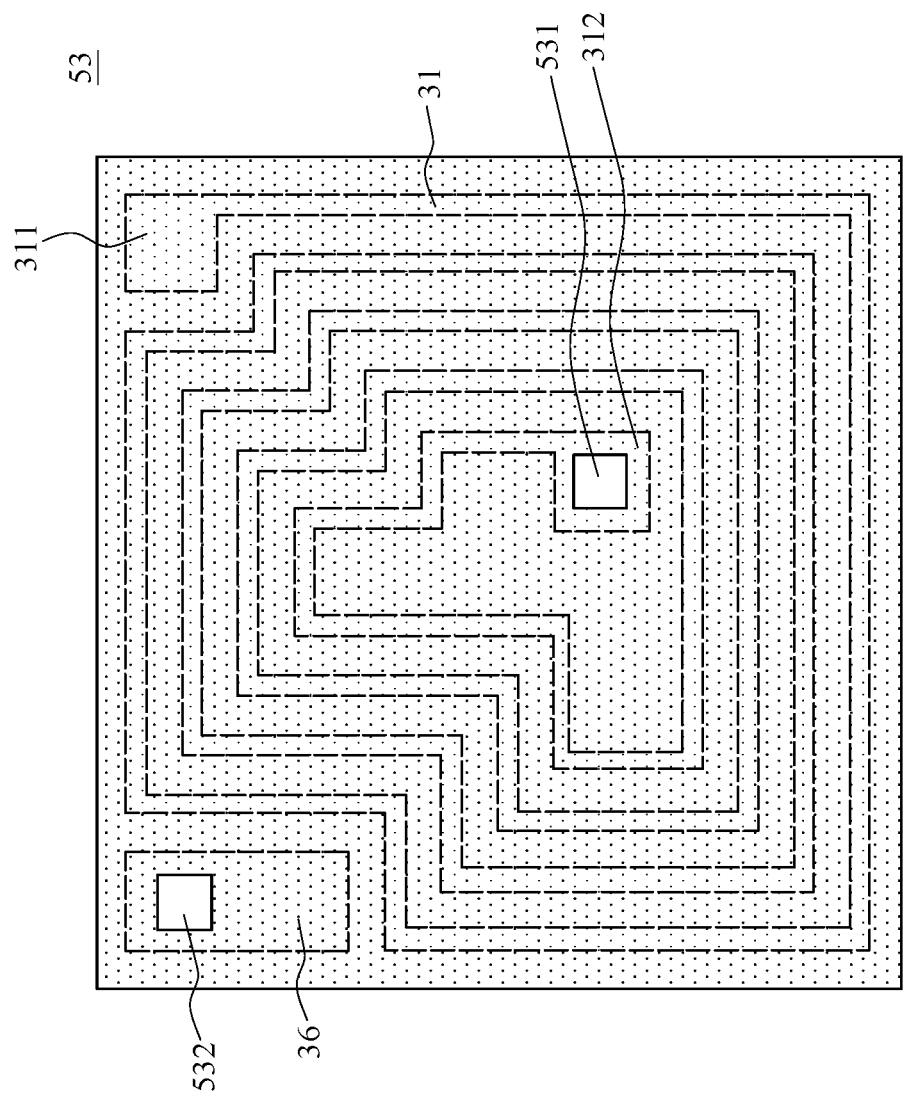
FIG. 3D is a structural top view of a second insulation layer of the present invention.

As shown in FIG. 2, FIG. 3C, and FIG. 3D, a second insulation layer 53 is configured on the first insulation layer 51 and used for covering the first loop antenna line segment 31 and the first connection line segment 36. The second insulation layer 53 comprises a third conductive through hole 531 and a fourth conductive through hole 532. The third conductive through hole 531 is through the second insulation layer 53 to configure on the second connection pad 312 of the first loop antenna line segment 31, and the fourth conductive through hole 532 is through the second insulation layer 53 to configure on the first connection line segment 36.

Figure 3E:
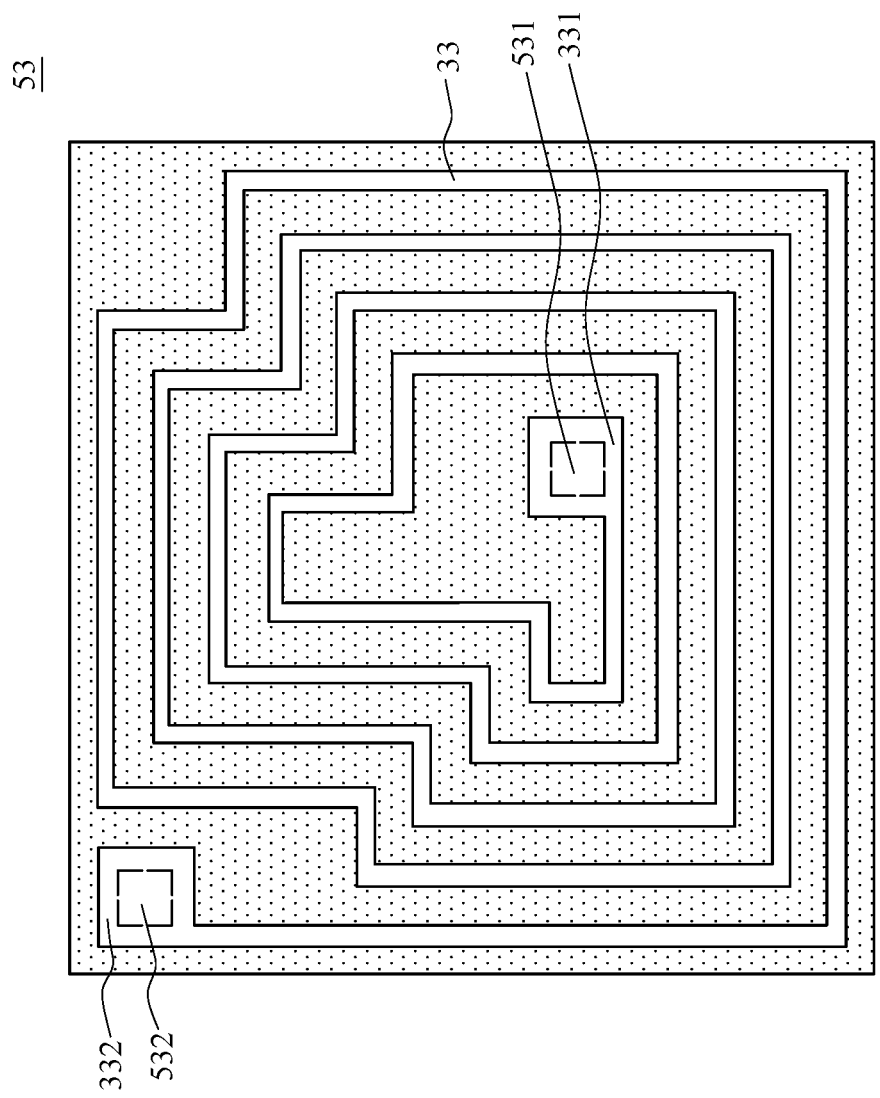
FIG. 3E is a structural top view of the second insulation layer provided with a second loop antenna segment of the present invention.
Figure 3F:
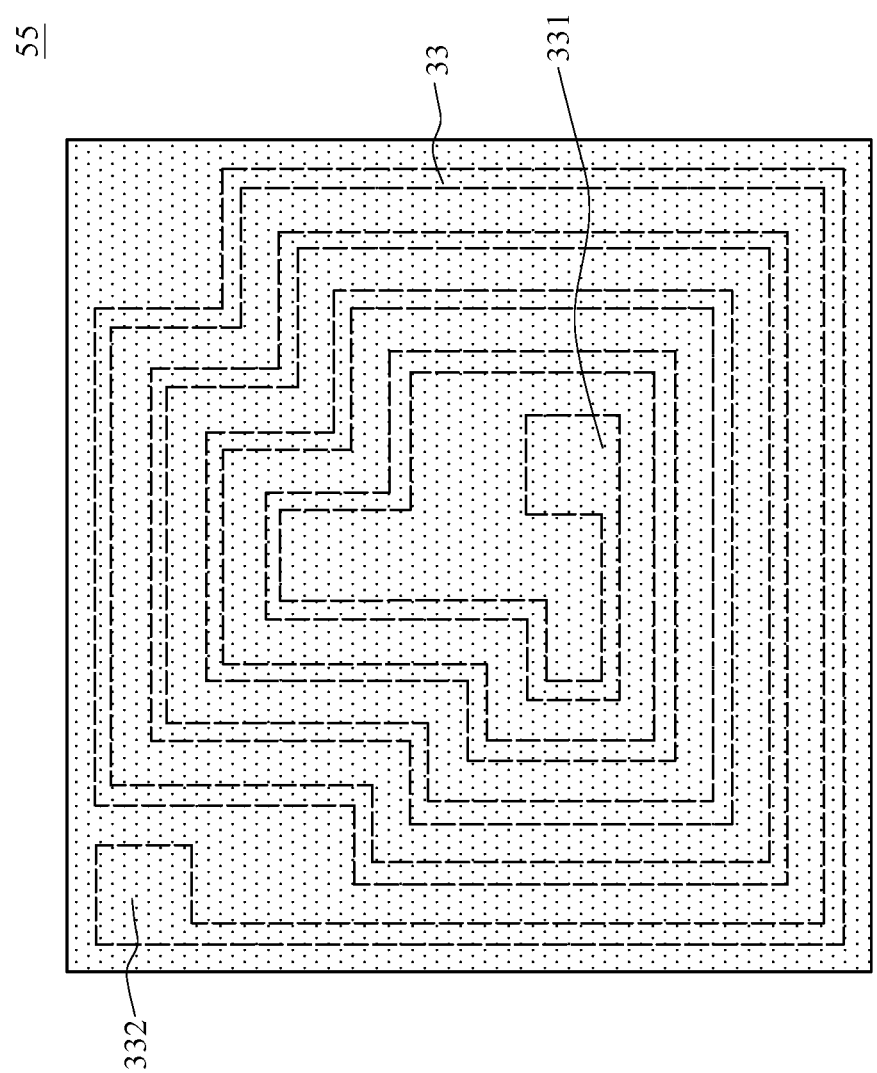
FIG. 3F is a structural top view of a third insulation layer of the present invention.

As shown in FIG. 2, FIG. 3D, and FIG. 3E, the second loop antenna line segment 33 is configured on the second insulation layer 53. The second loop antenna line segment 33 is provided at one end thereof with a third connection pad 331, and provided at other thereof with a fourth connection pad 332. The third connection pad 331 of the second loop antenna line segment 33 is electrically connected to the second connection pad 312 of the first loop antenna line segment 31 via the third conductive through hole 531, the fourth connection pad 332 of the second loop antenna line segment 33 is electrically connected to the first connection line segment 36 via the fourth conductive through hole 532. Finally, as shown in FIG. 2 and FIG. 3F, a third insulation layer 55 is configured on the second insulation layer 53 and used for covering the second loop antenna line segment 33, in such a way that the production of the RFID tag 200 will be finished. Thus, the first insulation layer 51, the first loop antenna line segment 31, the first connection line segment 36, the second insulation layer 53, the second loop antenna line segment 33, and the third insulation layer 53 are produced in the way of wafer fabrication, and sequentially stacked on the RFID chip 20. In one embodiment of the present invention, the insulation layers 51, 53, 55 are synthetic insulation layers produced by Polybenzoxazole (PBO), and disposed between the RDL layers, for example, the loop antenna line segments 31 and 33. In a preferred embodiment of the present invention, the first loop antenna line segment 31 and the second loop antenna line segment 33 of the antenna 30 are respectively designed as a spiral line segment having more bending, which can increase the length of the line segment of the antenna 30 to expand a communication distance of RFID tag 200.

Accordingly, the_RFID tag 200 of the present invention is produced by the way of wafer fabrication, and the structure of the antenna 30 of the_RFID tag 200 may be formed by multi-layers of loop segments 31, 33 so as to effectively reduce the size of the RFID tag 200, and therefore obtain a miniaturized RFID tag 200.

Figure 4:
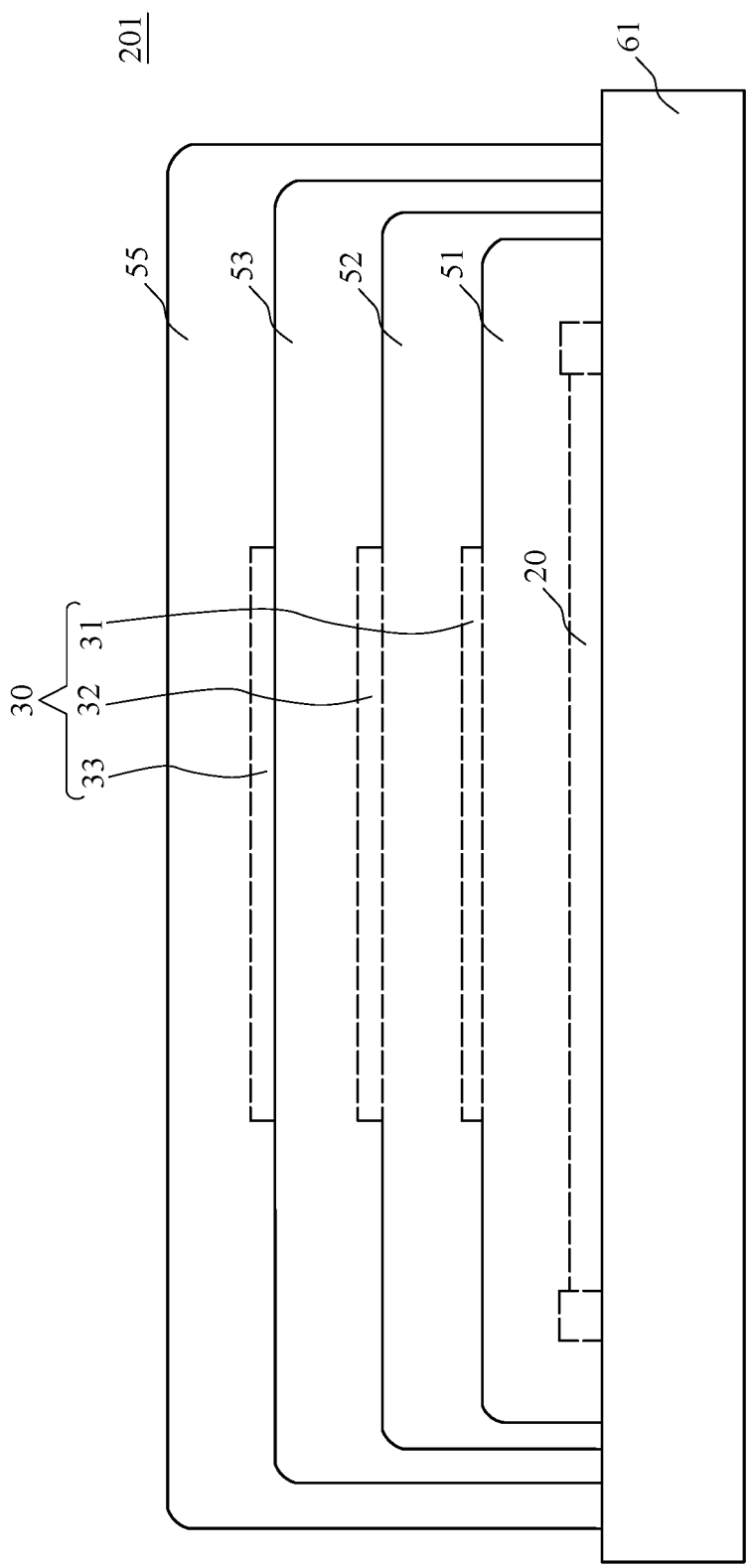
FIG. 4 is a structural perspective side view of a radio frequency identification tag according to another embodiment of the present invention.

Referring to FIG. 4, there is shown a structural perspective side view of a radio frequency identification tag according to another embodiment of the present invention, as well as referring to FIGS. 5A to 5E, there are shown a structural top view of each layer of the radio frequency identification tag according to another embodiment of the present invention, respectively. As shown in FIG. 4, the antenna 30 of RFID tag 201 of the present embodiment comparing to the antenna 30 of RFID tag 200 of the above described embodiment is further provided with at least one layer of additional loop antenna line segment.

Similarly, the RFID tag 201 of the present embodiment can be also produced in the way of wafer fabrication. The structure disclosed in FIG. 4, FIG. 5A, FIG. 5B, and FIG. 5C are the same as the above described embodiment, the first insulation layer 51 is configured on the RFID chip 20, the first loop antenna line segment 31 and the first connection line segment 36 are configured on the first insulation layer 51. The first connection pad 311 of the first loop antenna line segment 31 is electrically connected to the first antenna bonding pad 211 of the RFID chip 20 via the first conductive through hole 511, and the first connection line segment 36 is electrically connected to the second antenna bonding pad 212 of the RFID chip 20 via the second conductive through hole 512 of the first insulation layer 51.

Figure 5B:
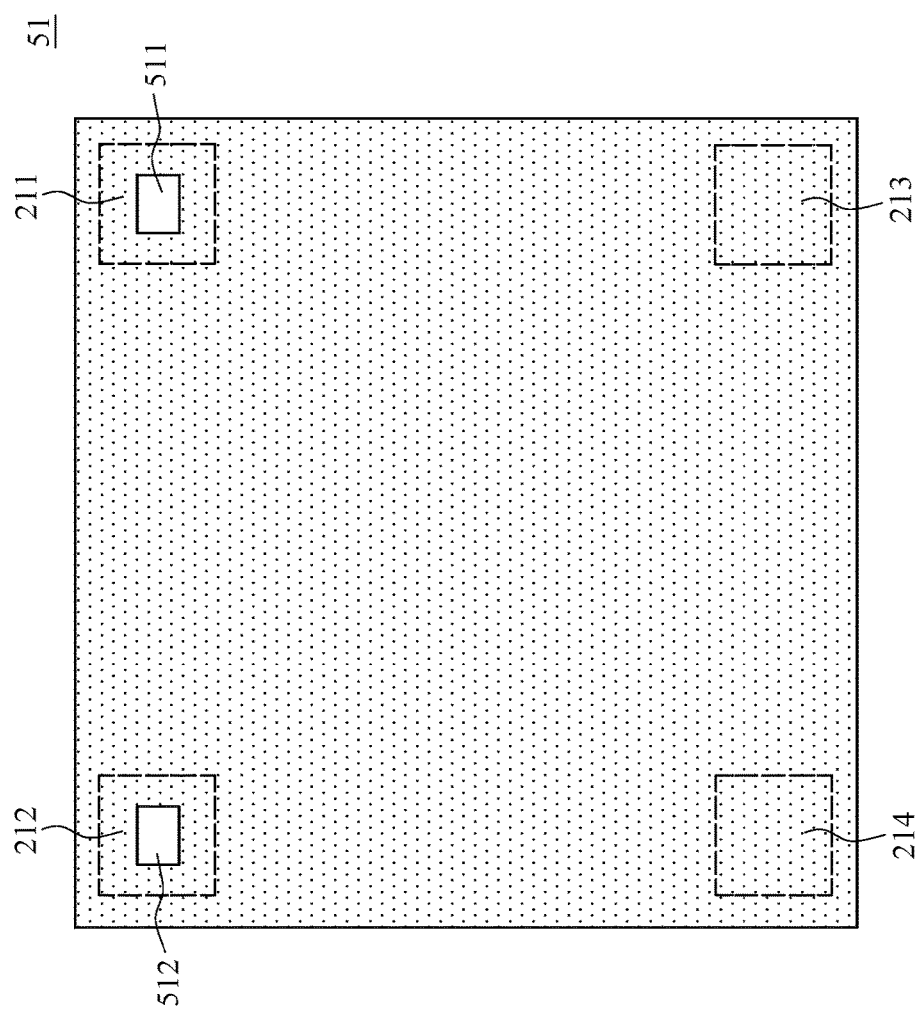
FIG. 5B is a structural top view of a first insulation layer of the present invention.
Figure 5C:
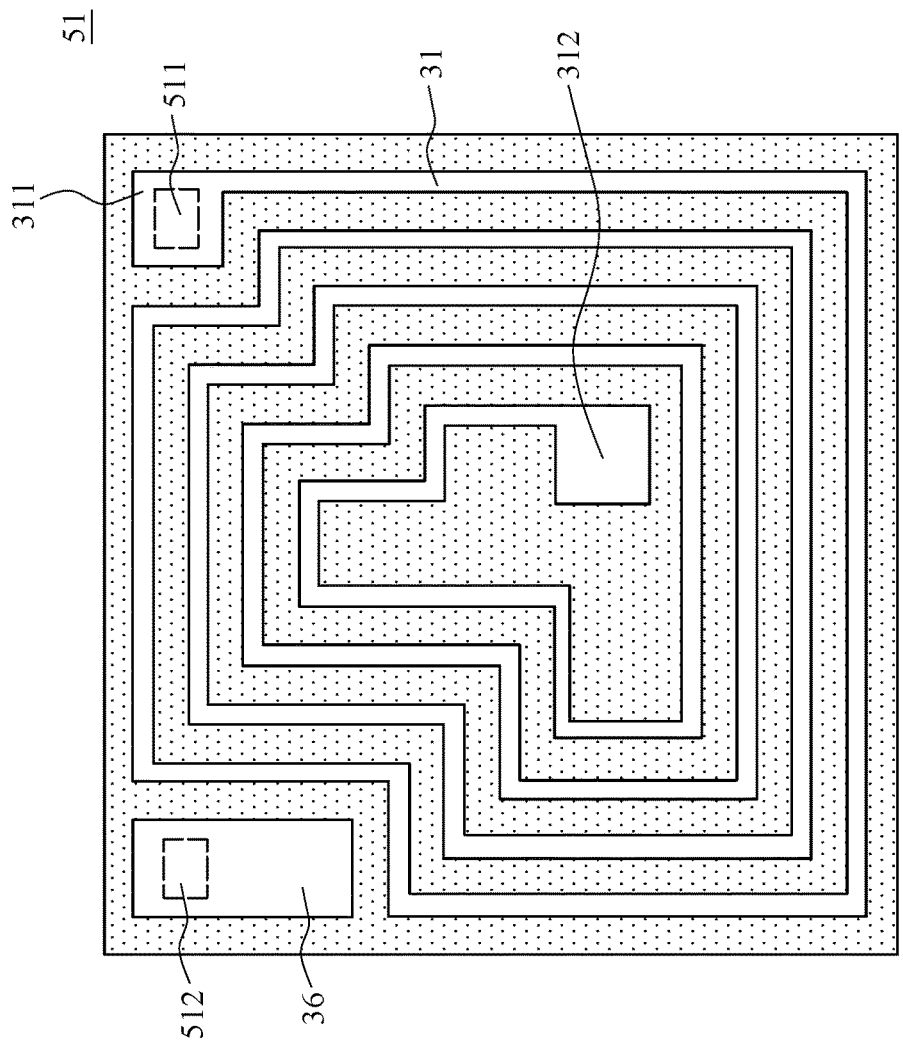
FIG. 5C is a structural top view of the first insulation layer provided with a first loop antenna segment and a first connection line segment of the present invention.
Figure 5D:
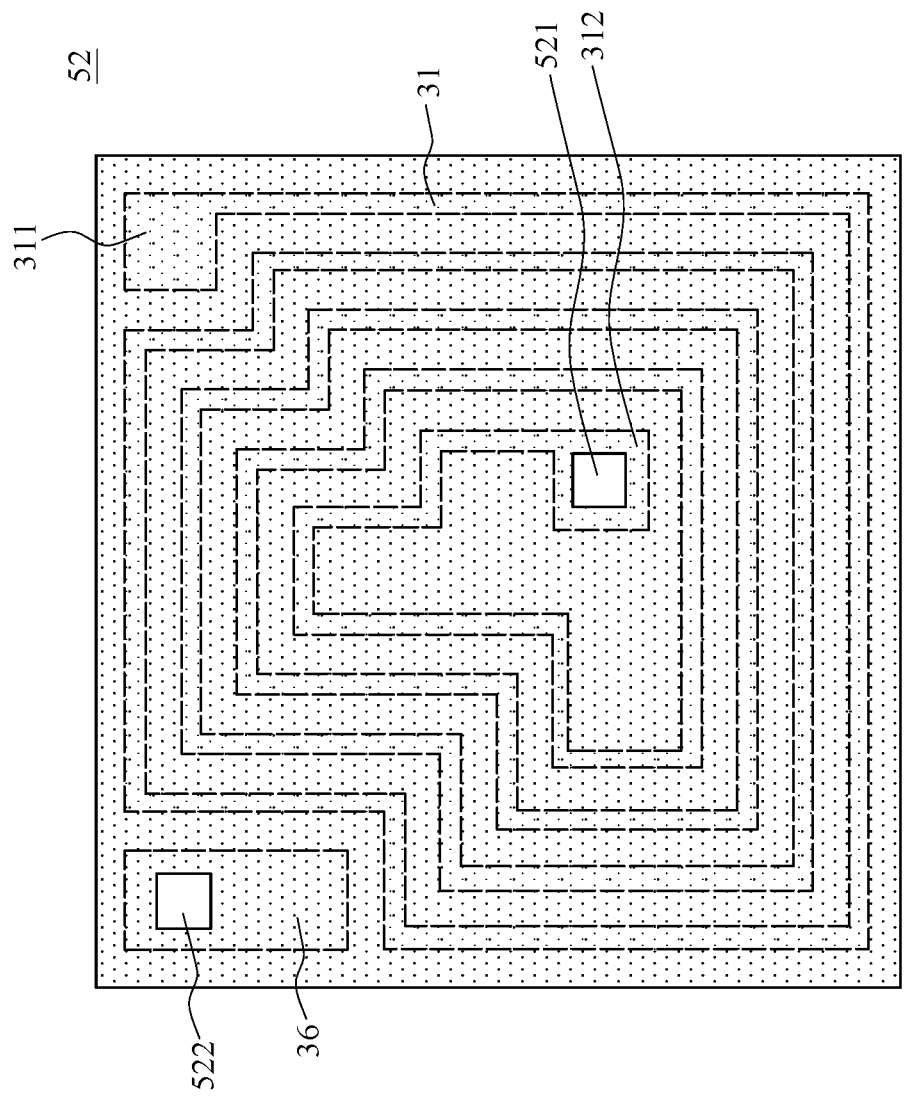
FIG. 5D is a structural top view of an additional insulation layer of the present invention.

As shown in FIG. 4 and FIG. 5D, at least one additional insulation layer 52 is configured on the first insulation layer 51, and used for covering the first loop antenna line segment 31 and the first connection line segment 36. The additional insulation layer 52 comprises a first additional conductive through hole 521 and a second additional conductive through hole 522. The first additional conductive through hole 521 is through the additional insulation layer 52 to configure on the second connection pad 312 of the first loop antenna line segment 31, and the second additional conductive through hole 522 is through the additional insulation layer 52 to configure on the first connection line segment 36. Similarly, the additional insulation layer 52 is a synthetic insulation layer produced by PBO.

Figure 5E:
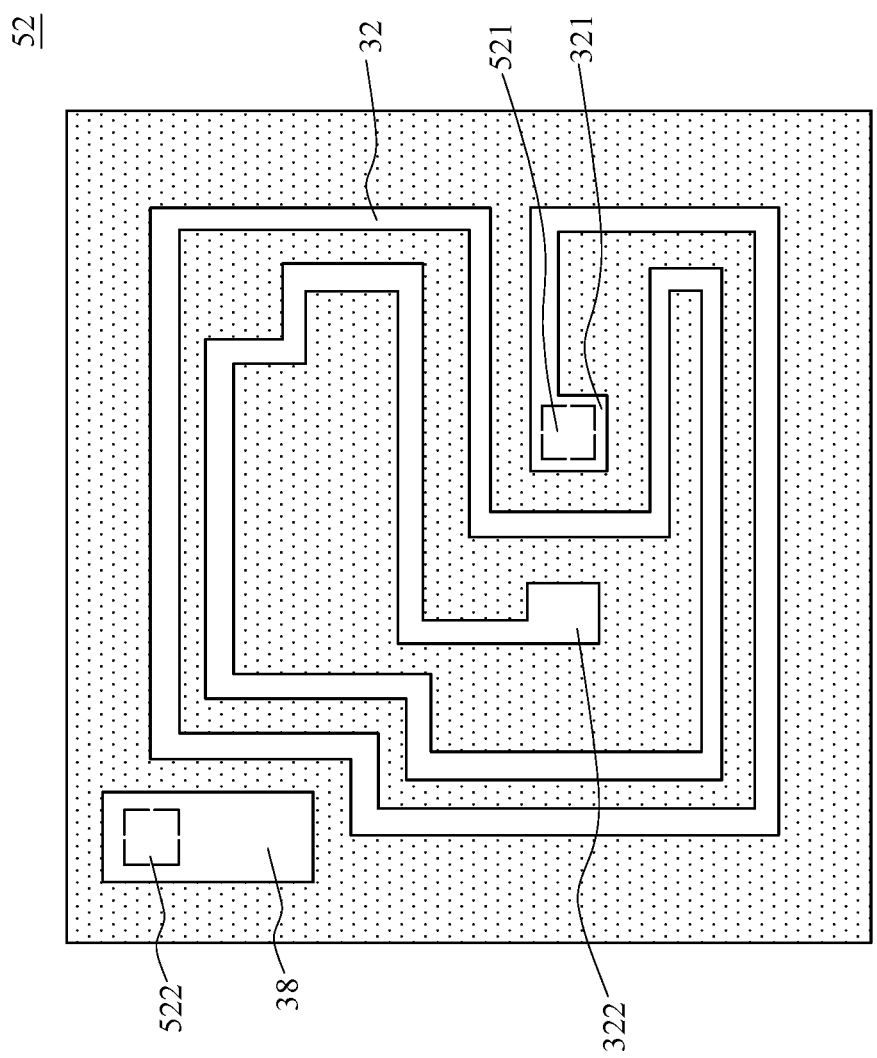
FIG. 5E is a structural top view of the additional insulation layer provided with an additional loop antenna segment and an additional connection line segment of the present invention.

As shown in FIG. 4, FIG. 5D, and FIG. 5E, at least one additional loop antenna line segment 32 is configured on the additional insulation layer 52. In one embodiment of the present invention, the additional loop antenna line segment 32 is also RDL. The additional loop antenna line segment 32 is also designed as a spiral line segment having more bending. The additional loop antenna line segment 32 is provided at one end thereof with a first additional connection pad 321, and provided at other end thereof with a second additional connection pad 322. The first additional connection pad 321 of the additional loop antenna line segment 32 is electrically connected to the second connection pad 312 of the first loop antenna line segment 31 via the first additional conductive through hole 521. Furthermore, the additional insulation layer 52 is further provided with an additional connection line segment 38 thereon. The additional connection line segment 38 is connected to the first connection line segment 36 via the second additional conductive through hole 522.

Figure 5F:
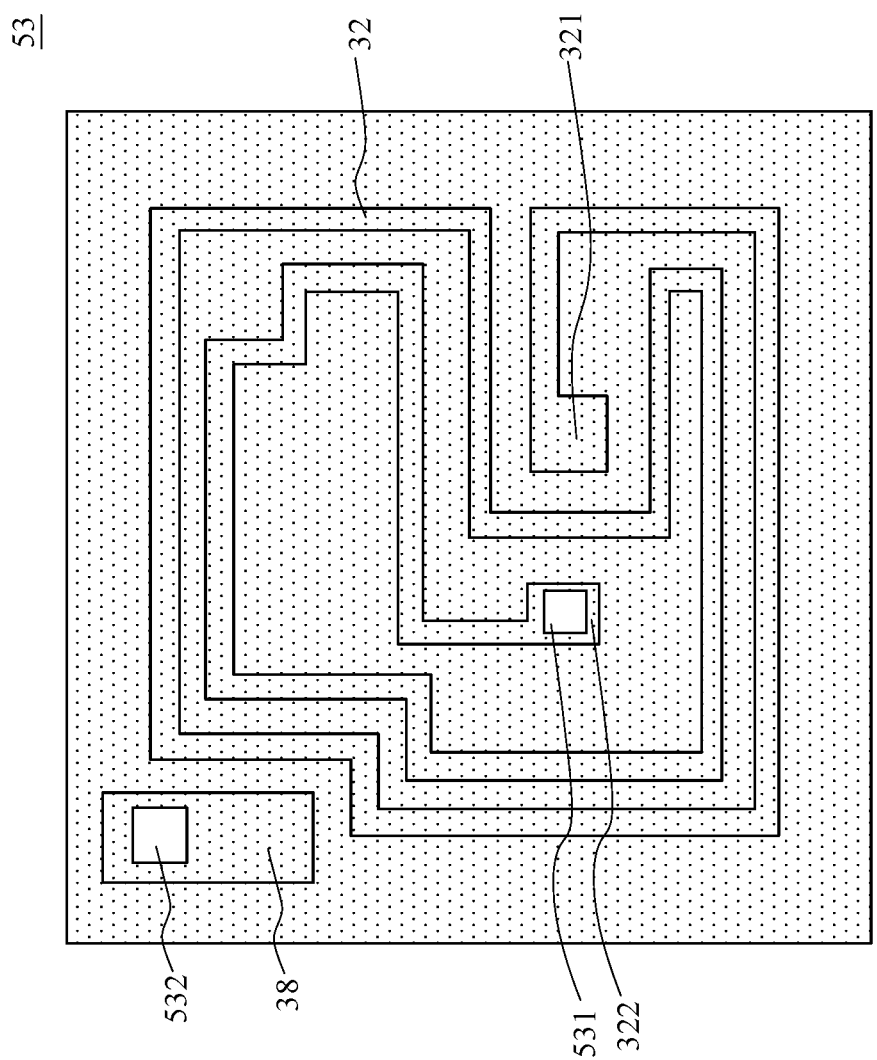
FIG. 5F is a structural top view of a second insulation layer of the present invention.

As shown in FIGS. 4, FIG. 5E, and FIG. 5F, the second insulation layer 53 is configured on the additional insulation layer 52. The additional loop antenna line segment 32 and the additional connection line segment 38 are configured between the additional insulation layer 52 and the second insulation layer 53. In the present embodiment, the third conductive through hole 531 of the second insulation layer 53 is configured on the second additional connection pad 322 of the additional loop antenna line segment 32, and the fourth conductive through hole 532 of the second insulation layer 53 is configured on the additional connection line segment 38.

Figure 5G:
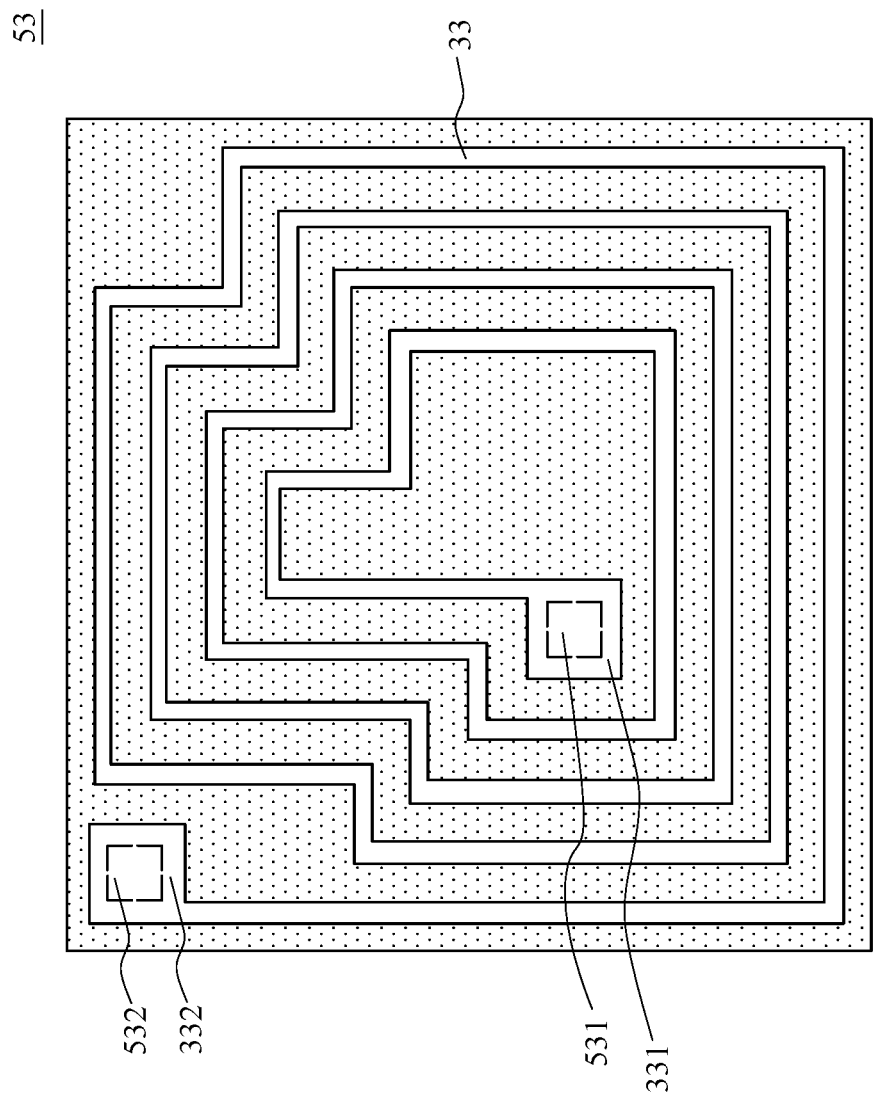
FIG. 5G is a structural top view of the second insulation layer provided with a second loop antenna segment of the present invention.
Figure 5H:
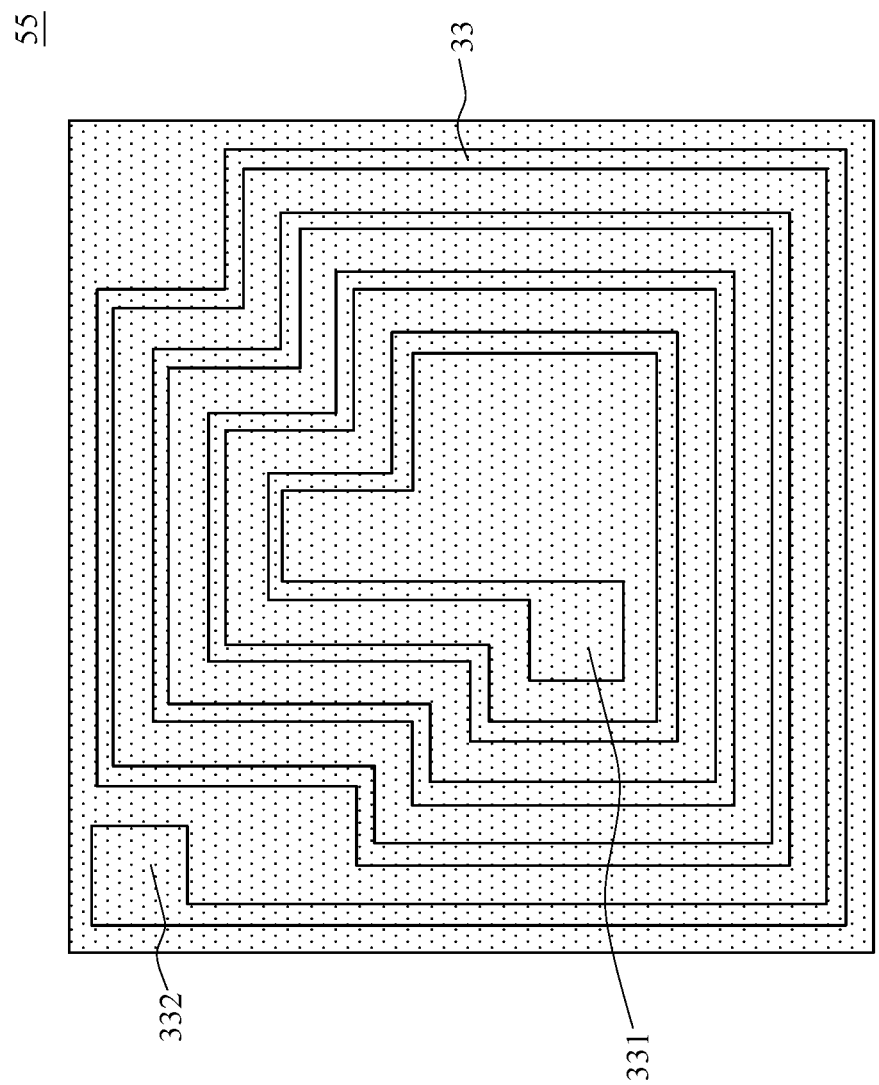
FIG. 5H is a structural top view of a third insulation layer of the present invention.

As shown in FIG. 4, FIG. 5F, and FIG. 5G, the second loop antenna line segment 33 is configured on the second insulation layer 53. The third connection pad 331 of the second loop antenna line segment 33 is electrically connected to the second additional connection pad 322 of the additional loop antenna line segment 32 via the third conductive through hole 531, and the fourth connection pad 332 of the second loop antenna line segment 33 is electrically connected to the second connection line segment 38 via the fourth conductive through hole 532. Finally, as shown in FIG. 4 and FIG. 5H, the third insulation layer 55 is configured on the second insulation layer 53 and used for covering the second loop antenna line segment 33, in such a way that the production of the RFID tag 201 will be finished. Thus, the first insulation layer 51, the first loop antenna line segment 31, the first connection line segment 36, the additional insulation layer 52, the additional antenna line segment 32, the additional loop antenna line segment 38, the second insulation layer 53, the second loop antenna line segment 33, and the third insulation layer 53 are produced in the way of wafer fabrication, and sequentially stacked on the RFID chip 20. Accordingly, the RFID tag 201 of the present invention is produced by the way of wafer fabrication, and the structure of the antenna 30 of the_RFID tag 200 may be formed by three or more layers of loop segments 31, 32, 33 so as to effectively reduce the size of the RFID tag 200, and therefore obtain a miniaturized RFID tag 201. In the present embodiment, the antenna 30 can be implemented by three or more layers of loop antenna line segments, so that the length of line segment of the antenna 30 can be further increased, and the communication distance of RFID tag 201 can be further expanded. In addition, the conductive through holes 511, 512, 521, 522, 531, 532 are designed with a larger opening width so as to increase the area of electrical contact between RFID chip 20 and the antenna line segments 31, 32, and 33.

The bonding pads 211, 212, 213, 214 of the RFID chip 20 are ground down by a grinding process to eliminate the copper bump which is on the pads. Thus, the bonding pads 211, 212, 213, 214 are ground down and flattened so that the antenna line segments 31, 32, and 33 of the antenna 30 are able to horizontally configure on the insulation layers 51, 53, 55 and lie flat. In the present invention, the first antenna bonding pad 211 and the second antenna bonding pad 212 of the RFID chip 20 will adopt the conductive through holes 511, 512, 521, 522, 531, 532 of the insulation layer 51, 52, 53 to connect to the loop antenna segments 31, 32, 33, not the bumps. Thus, the RFID tag 201 of the present invention is fabricated by a means of a bump-less procedure, so as to reduce the height of the RFID tag 201, and therefore further reduce the size of the RFID tag 201.

Figure 6A:
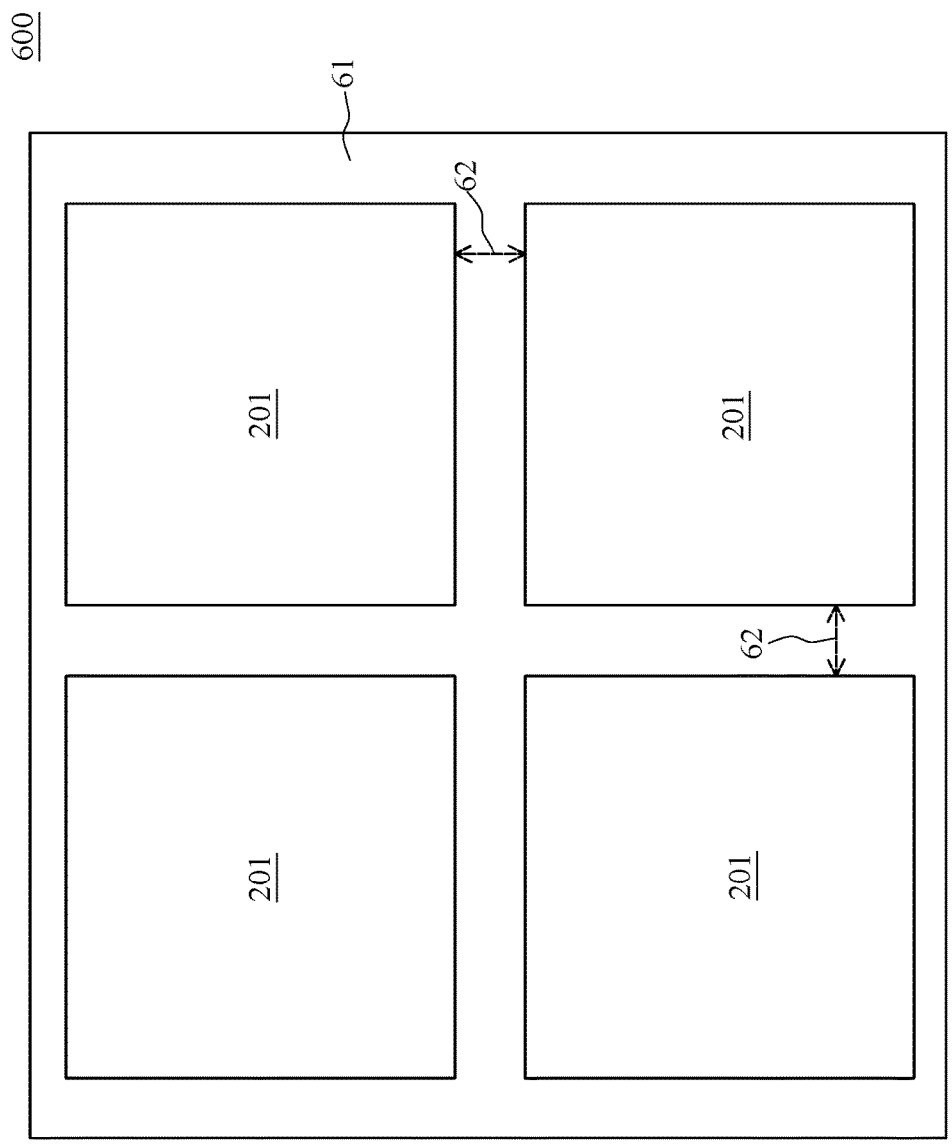
FIG. 6A is a structural top view of a wafer of an embodiment of the present invention.
Figure 6B:
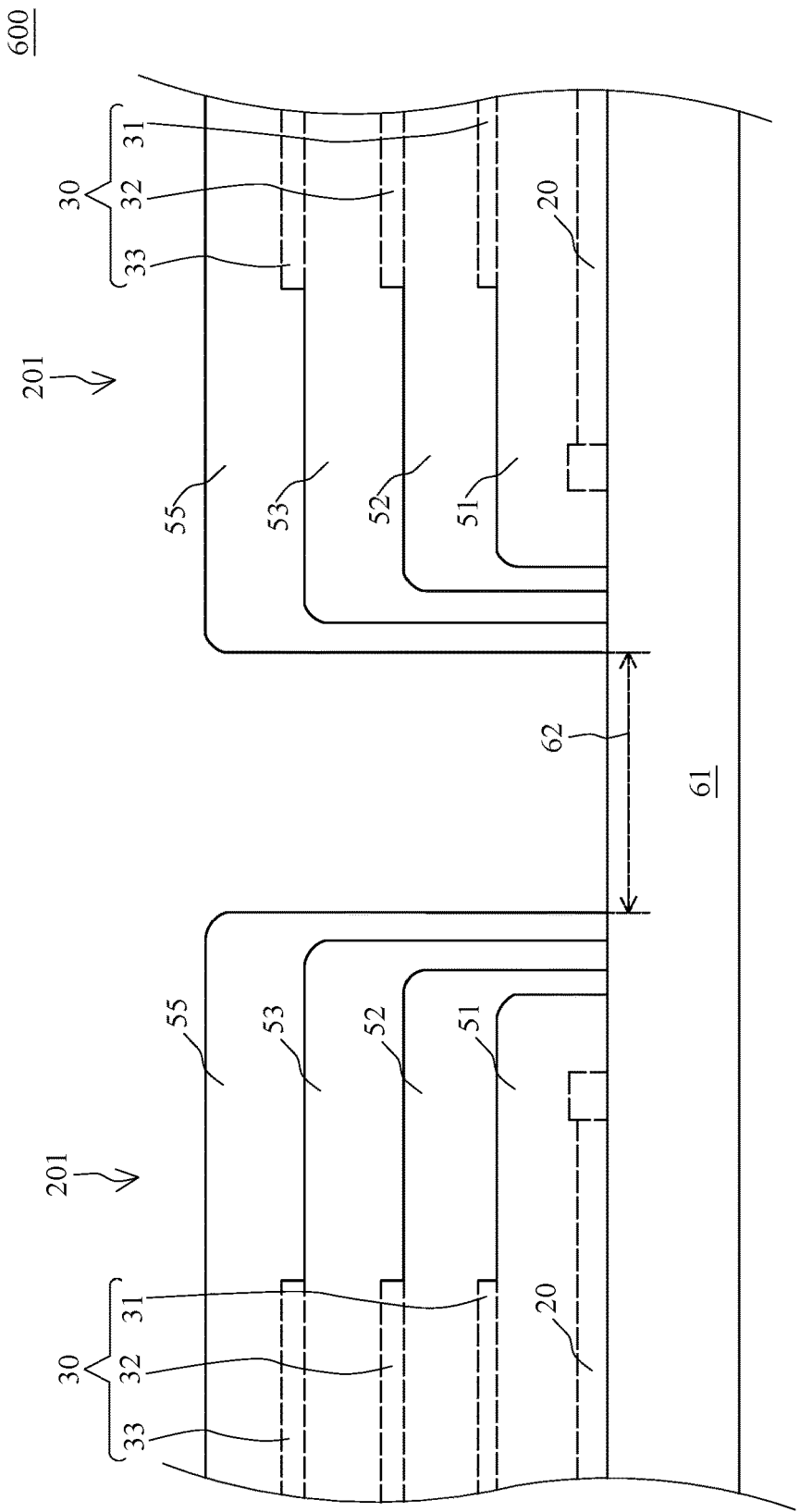
FIG. 6B is a partial structural perspective side view of a wafer of an embodiment of the present invention.

Referring to FIGS. 6A and 6B, a structural top view and a partial structural side view of a wafer of an embodiment of the present invention, respectively. As shown in FIG. 6A, the RFID tag 201 of the present invention will be produced by the way of the wafer fabrication. A plurality of RFID tags 201 will be laid on a substrate 61 of a wafer 600 in an array manner. As shown in FIG. 6B, a street 62 is defined between each of radio frequency identification tags 201 in the substrate 61. A cutting process is executed for the wafer 600 based on the street 62 so as to cut out each RFID tag 201 from the wafer 600. By the means of the wafer fabrication, the minimized radio frequency identification tag 201 can be implemented. For example, the length and width of the radio frequency identification tag 201 can be miniaturized to 0.41 mm×0.43 mm.

In a preferred embodiment of the present invention, the ratios of the line width to the line space of the first loop antenna line segment 31, the additional loop antenna line segment 32, and the second loop antenna line segment 33 are designed as 1:1, respectively. The line widths/the line spaces of the first loop antenna line segment, the additional loop antenna line segment 32, and the second loop antenna line segment 33 are designed as 15 µm/15 µm, respectively. The thicknesses of the first insulation layer 51, the additional insulation layer 52, the second insulation layer 53 are designed as 7.5 µm±0.5 µm, respectively. The thicknesses of the first loop antenna line segment 31, the additional loop antenna line segment 32, the second loop antenna line segment 33, the first connection line segment 36, and the additional connection line segment 38 are designed as 4 µm±0.5 µm. The line widths, the line spaces, and the thicknesses of the antenna segments 31, 32, 33 and the connection line segments 36, 38, and the thicknesses of the insulation layers 51, 52, 53, 55 described in the above are only a specific embodiment of the present invention, including but not limited thereto.

Taking an application as example, the miniaturized RFID tag 200/201 of the present invention may be disposed on a shell of a bullet, and record a background information (such as the manufacturing time, the manufacturing location, the model and the owned person or unit) related with the bullet. Accordingly, the controlling of ammunitions can be achieved by the RFID 200/201 configured on the bullet.

Taking other application as example, the miniaturized RFID tag 200/201 of the present invention may be embedded in paper money, and record a security information (such as digital watermark or encrypted verification code) of paper money. Accordingly, the RFID 200/201 having the security information can be embedded in paper money, and used for replacing the original security design (such as gravure printing) on the paper money.

Taking another application as example, further, the miniaturized RFID tag 200/201 of the present invention may be disposed on an electronic component (such as an ASIC, an active element, or a passive element), and record a background information (such as shipping source, component characteristics) related with the electronic component. Accordingly, the user can know the source and the component characteristics of the electronic component by the RFID 200/201 provided on the electronic component. The above described examples are merely parts of the applications of the present invention, including but not limited thereto.

Summed up, the RFID tag 200/201 of the present invention is produced by the way of wafer fabrication, the size of which is able to achieve the purpose of miniaturization. The miniaturized RFID tag 200/201 of the present invention can be disposed on an object having larger or smaller size, and therefore may be widely applied to various fields.

The above disclosure is only the preferred embodiment of the present invention, and not used for limiting the scope of the present invention. All equivalent variations and modifications on the basis of shapes, structures, features and spirits described in claims of the present invention should be included in the claims of the present invention

What is claimed is:

1. A miniaturized radio frequency identification tag, comprising:
    a radio frequency identification chip comprising an active surface, the active surface comprising a first antenna bonding pad and a second antenna bonding pad;
    a first insulation layer, configured on the radio frequency identification chip, used for covering the radio frequency identification chip, and comprising a first conductive through hole and a second conductive through hole, wherein the first conductive through hole is configured on the first antenna bonding pad of the radio frequency identification chip, and the second conductive through hole is configured on the second antenna bonding pad of the radio frequency identification chip;
    a first loop antenna line segment configured on the first insulation layer, wherein the first loop antenna line segment is provided at one end thereof with a first connection pad, and provided at other end thereof with a second connection pad, the first connection pad of the first loop antenna line segment is electrically connected to the first antenna bonding pad of the radio frequency identification chip via the first conductive through hole;
    a first connection line segment configured on the first insulation layer, wherein the first connection line segment is electrically connected to the second antenna bonding pad of the radio frequency identification chip via the second conductive through hole;
    a second insulation layer, configured on the first insulation layer, used for covering the first loop antenna line segment and the first connection line segment, and comprising a third conductive through hole and a fourth conductive through hole;
    a second loop antenna line segment configured on the second insulation layer, wherein the second loop antenna line segment is provided at one end thereof with a third connection pad, and provided at other thereof with a fourth connection pad, the third connection pad of the second loop antenna line segment is electrically connected to the second connection pad of the first loop antenna line segment via the third conductive through hole, the fourth connection pad of the second loop antenna line segment is electrically connected to the first connection line segment via the fourth conductive through hole; and
    a third insulation layer, configured on the second insulation layer, and used for covering the second loop antenna line segment.

2. The miniaturized radio frequency identification tag according to claim 1, wherein the first insulation layer, the first loop antenna line segment, the first connection line segment, the second insulation layer, the second loop antenna line segment, and the third insulation layer are produced in a way of wafer fabrication, and sequentially stacked on the radio frequency identification chip.

3. The miniaturized radio frequency identification tag according to claim 1, wherein the first loop antenna line segment and the second loop antenna line segment are a spiral line segment having more bending, respectively.

4. The miniaturized radio frequency identification tag according to claim 3, wherein a ratio of a line width to a line space of the first loop antenna line segment is 1:1.

5. The miniaturized radio frequency identification tag according to claim 4, wherein the line width/the line space of the first loop antenna line segment is 15 μm/15 μm.

6. The miniaturized radio frequency identification tag according to claim 3, wherein a ratio of a line width to a line space of the second loop antenna line segment is 1:1.

7. The miniaturized radio frequency identification tag according to claim 6, wherein the line width/the line space of the second loop antenna line segment is 15 μm/15 μm.

8. The miniaturized radio frequency identification tag according to claim 1, wherein the first insulation layer and the second insulation layer are synthetic insulation layers produced by polybenzoxazole.

9. The miniaturized radio frequency identification tag according to claim 1, wherein the miniaturized radio frequency identification tag further comprises:
    at least one additional insulation layer is configured between the first insulation layer and the second insulation layer, and comprises a first additional conductive through hole and a second additional conductive through hole;
    at least one additional loop antenna line segment is configured between the additional insulation layer and the second insulation layer, and provided at one end thereof with a first additional connection pad, and provided at other end thereof with a second additional connection pad, wherein the first additional connection pad of the additional loop antenna line segment is electrically connected to the second connection pad of the first loop antenna line segment via the first additional conductive through hole, and the second additional connection pad of the additional loop antenna line segment is electrically connected to the third connection pad of the second loop antenna line segment via the third conductive through hole; and
    at least one additional connection line segment is configured between the additional insulation layer and the second insulation layer, wherein the additional connection line segment is connected at one end thereof to the first connection line segment via the second additional conductive through hole, and connected at other end thereof to the fourth connection pad of the second loop antenna line segment via the fourth conductive through hole.

10. The miniaturized radio frequency identification tag according to claim 9, wherein the first insulation layer, the first loop antenna line segment, the first connection line segment, the additional insulation layer, the additional loop antenna line segment, the additional connection line segment, the second insulation layer, the second loop antenna line segment, and the third insulation layer are produced in a way of wafer fabrication, and sequentially stacked on the radio frequency identification chip.

11. The miniaturized radio frequency identification tag according to claim 9, wherein the additional loop antenna line segment is a spiral line segment having more bending.

12. The miniaturized radio frequency identification tag according to claim 11, wherein a ratio of a line width to a line space of the additional loop antenna line segment is 1:1.

13. The miniaturized radio frequency identification tag according to claim 12, wherein the line width/the line space of the additional loop antenna line segment is 15 μm/15 μm.

14. The miniaturized radio frequency identification tag according to claim 9, wherein the first insulation layer, the additional insulation layer, and the second insulation layer are synthetic insulation layers produced by polybenzoxazole.

15. The miniaturized radio frequency identification tag according to claim 1, wherein the miniaturized radio frequency identification tag is fabricated by a means of bumpless procedure.

16. The miniaturized radio frequency identification tag according to claim 1, wherein the miniaturized radio frequency identification tag is a passive radio frequency identification tag.

* * * * *